April 17, 1934.  A. BIZZARRI  1,955,705
HYDRAULIC CLUTCH
Filed March 13, 1931
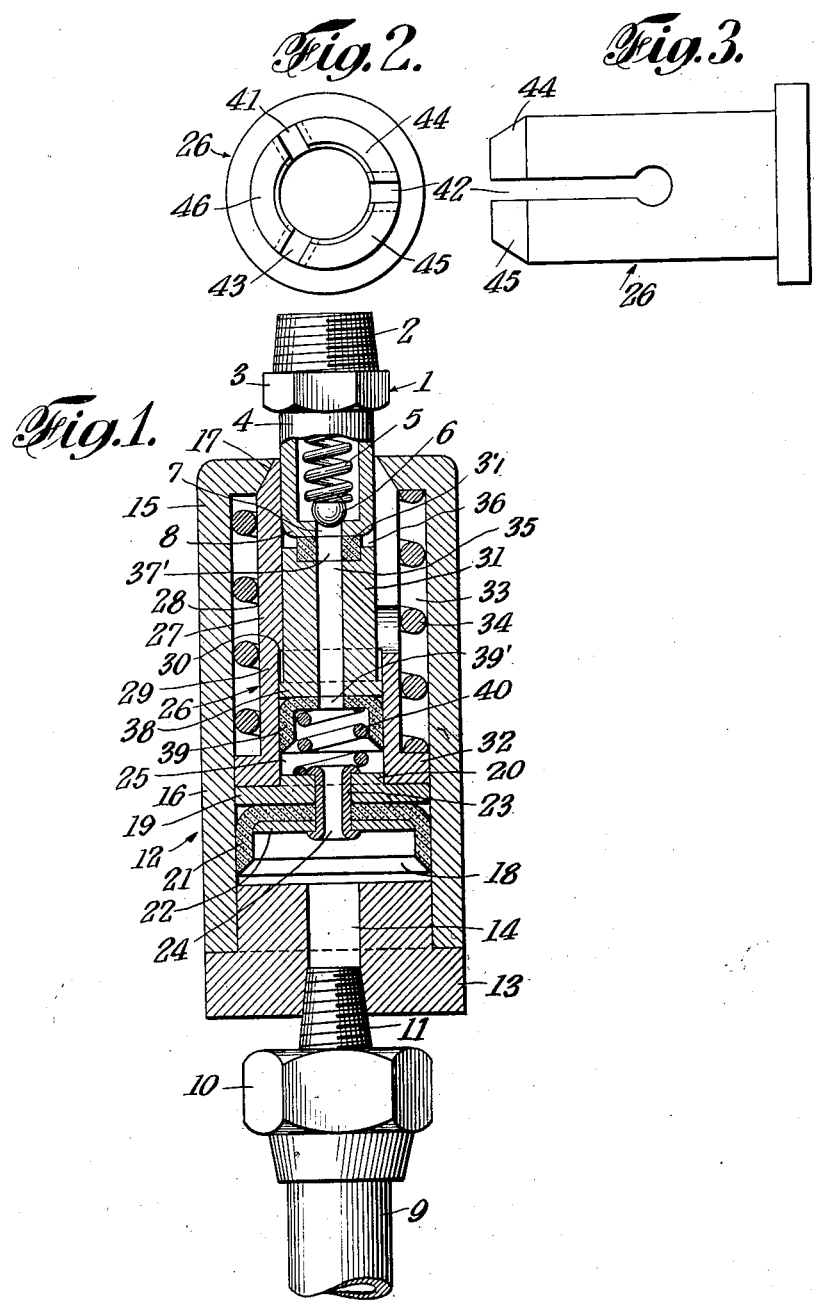
INVENTOR
Anthony Bizzarri
BY
Edward M. Grant
ATTORNEY.

Patented Apr. 17, 1934

1,955,705

UNITED STATES PATENT OFFICE 1,955,705

HYDRAULIC CLUTCH

Anthony Bizzarri, New York, N. Y.

Application March 13, 1931, Serial No. 522,334

9 Claims. (Cl. 285—161)

My present invention relates to hydraulic clutches, particularly such as are adapted to serve for the purpose of effectively connecting a source of supply of lubricant, generally under considerable pressure, with a grease-cup or other lubricant receiving device which is intended to receive such lubricant, generally under substantial pressure, and to convey the same to the bearing or other portion or portions of a motor vehicle or other machine having one or more parts required to be lubricated. It is the aim of the present invention to devise articles of the general character which are simple in construction, which may readily, conveniently and economically be fabricated and assembled, and which may be conveniently and effectively operated, the devices of the present invention being further characterized by their novel structures, their new mode of operation, which is entirely different from the mode of operation of the devices hitherto used for the same general purposes and by the further fact that such operation is dependent upon the hydraulic pressure created by the lubricant itself, which hydraulic pressure serves to render the device effective in operation when the lubricant is turned on and renders the device automatically and easily removable when the lubricant is turned off. Other objects and advantages of the pres- invention will in part be pointed out in detail hereinafter and will in part be obvious to those skilled in the art to which the present invention relates.

In the accompanying specification I shall describe, and in the annexed drawing show, an illustrative embodiment of the present invention. It is, however, to be clearly understood that my invention is not limited to the specific embodiment thereof herein shown and described for purposes of illustration only.

Referring to the drawing, in which I have shown the aforesaid illustrative embodiment of the present invention:

Fig. 1 is a longitudinal sectional view; partly in elevation, of the aforesaid illustrative embodiment of the present invention;

Fig. 2 is a top plan view of the gripping member or collet; and

Fig. 3 is a side view of the gripping member or collet shown in Fig. 2 of the drawing.

Referring now to the aforesaid illustrative embodiment of the present invention, and with particular reference to the drawing illustrating the same, 1 indicates generally a fitting, such as a grease-cup, by means of which lubricant may be applied to a bearing or other suitable portion of an automobile, locomotive or other suitable machine. As here shown, the grease-cup or fitting 1 has the inner tapered externally threaded portion 2 by means of which the fitting or grease-cup may be secured in the desired part of the machine which it is intended to lubricate. 3 indicates the usual flange portion with which is associated the nipple 4 which contains the expansion spring 5, one end of which presses against a portion of the flange member 3 within the nipple 4 and the other end of which presses against a check valve 6 which may be the usual ball check valve and which controls the outlet 7 in the flange portion 3 of the nipple 4.

It will be seen that the grease-cup or equivalent fitting 1 is not provided with any mechanical means, such as a pin or pins, screw thread, or other positive mechanical means for connection to the adaptor or other means for connecting the source of supply of lubricant under pressure with the grease-cup or equivalent fitting. In other words, the device of the present invention renders possible the complete elimination of positive mechanical means on the grease-cup equivalent fitting for connecting the source of lubricant under pressure, such as an electrical grease-gun, with the nipple or equivalent device. Instead of such positive mechanical means, I make use of the hydraulic pressure of the source of the lubricant itself to bind the adaptor or other character device to the smoother outer surface of the grease-cup or other fitting.

The grease-gun itself, which may, for example, comprise an electrically operated grease-gun or other suitable source of lubricant pressure and which is here not deemed necessary to be shown, may include the grease-hose 9 having the nozzle 10. The nozzle 10 is provided with the substantially conically shaped nipple portion 11 for connection with the adaptor or connection means 12 at the end 13 of which is provided the inlet port 14 for grease under pressure, the outer end 15 being channeled to receive the nipple 4 in a manner which will be described in considerable detail later in this specification.

Referring to the adaptor or connection means 12, which will now be described in considerable detail, the same comprises an outer shell or casing 16 into which may be welded or otherwise suitably secured the end 13 provided with the grease inlet port 14 already described and which at its other end may be provided with the substantially frusto-conical opening 17. It may here be stated that the end 13 of the adaptor or connection device 12 may be internally threaded to cooperate with the external threads of the nipple portion 11 of the nozzle 10 already described.

The inner wall of the casing 16 provides a cylinder within whose space 18 a piston, generally designated by reference character 19, may reciprocate under the influence of hydraulic pressure in a manner which will be shortly described in considerable detail herein. The piston 19 may be in the form of a metalic disk having the central boss of projection 20. Associated with the lower face of the piston 19 is a leather cup 21 held in position against the lower face of the piston 19 by means of the gasket 22, the parts being held together by the sleeve 23 whose upper and lower ends are flanged over the upper face of the boss 20 forming a part of the piston 19 and over the outer face of the gasket 22 which serves to hold the leather cup in place. It will be noted that the diameter of the piston 19 is substantially equal to the internal diameter of the shell of the casing 16. It may here be stated that the sleeve 23 provides a port 24 through which grease may pass under pressure from the hose 9, through the nozzle 10, by way of the threaded nipple 11, into the grease inlet port 14, into the cylinder space 18 and thence through the port 24 into the smaller cylinder space 25 formed within the collet or equivalent gripping member 26 which will now be described in considerable detail.

The collet, which has been generaly designated by reference character 26, comprises the shell 27 whose shell portion 28 is of slightly smaller internal diameter than its lower portion 29, thus providing a stop 30 for the sealing member 31 in its relative motion upwardly with respect to the collet 26, in the position of the parts shown in Fig. 1 of the drawing.

The collet 26 has the lower flanged portion 32 whose external diameter is substantially equal to the internal diameter of the casing 16, it being clear, however, that there is enough clearance between the parts within the casing 16 and the casing itself to permit relative movement of the contained parts within the case 16 which contains them. The flange 32 rests on the piston 19 in the space provided therefore by the boss 20, the external diameter of which is substantially equal to the internal diameter of the collet casing 27 adjacent the bottom of the flanged portion 32 forming a part of the collet 26. Above the flange 32 there is provided, between the outer face of the collet 27 and the inner face of the adaptor casing 16, a space 33 in which may be placed a coiled expansion spring 34 the upper end of which bears against the under face of the inwardly turned end 15 of the adaptor casing 16, while its lower end bears against the upper face of the flanged portion 32.

Within the collet casing 27 and extending into the cylindrical space 25 within the lower portion 29 of the collet is the sealing piston 31 already referred to. The sealing piston 31, which is provided with a longitudinal port 35, has set into its upper face 36 the sealing gasket 37 which in turn is provided with the discharge port 37' in communication with the port 35 and thus adapted to communicate with the inlet port 8 controlled by the check valve 6 forming a part of the grease-cup or other fitting 1 already referred to. At its lower end the sealing piston or plunger 31 is provided with the enlarged flanged portion 38 which, by cooperation with the portion 30 on the interior of the collet member 27 between its upper and lower portions 28 and 29, respectively, serves to limit the extent of the upward movement of the sealing piston or plunger 31. The lower end of the sealing plunger or piston 31, comprising flanged portion 38 of enlarged external diameter, carries the leather cup 39. 40 is a coiled expansion spring the upper end of which bears against the inner face of the leather cup 39 provided with the port 39' with which the cylinder cup 39 is provided.

It will be noted that the diameter of the sealing piston or plunger is about one-half (½) of the diameter of the main piston 19 carrying the collet 26 within which the sealing piston or plunger reciprocates. Accordingly, assuming the same distribution of hydraulic pressure through the different parts of the device within the casing 16, the total hydraulic pressure on the main piston 19 carrying the collet 26 will be about four times the total hydraulic pressure exerted on the sealing piston or plunger 31 due to the ratio of 2 to 1 of the diameter of the pistons 19 and 31 respectively, which ratio of diameter must be squared to determine the ratio of the total hydraulic pressures exerted on such diameters. There is thus a substantial differential of hydraulic pressure in favor of the piston 19 which carries the collet 26. The collet 26 is preferably slotted in one or more places, as in the places 41, 42 and 43, thus providing the more or less springy gripping fingers 44, 45 and 46, respectively. These gripping fingers have their outer edges fitting into substantially frusto-conical opening 17 in the upper end of the casing 16 already referred to in this specification.

This completes the description of the aforesaid illustrative embodiment of the present invention. The manner of assembling such embodiments will, it is believed, be clear from the foregoing description. The manner of operating the device will, it is believed also be clear from the foregoing description and may be summarized as follows:

The operator intending to apply grease to a bearing of an automobile, locomotive or other machine, takes the adapter 12, into which has been threaded the nipple 11 of the nozzle 10, and with a slight pressure of the hand, applies it over the nipple 4, within the gripping members 44, 45 and 46, which preferably have a slight spring action. The space within the nipple, to which access is had by means of the port 8 controlled by the check valve 6, will thus be in line with the ports 37, 35, 39', 24 and 14, communicating with the cylinder spaces 25 and 18, respectively.

The valve controlling the source of supply of lubricant or equivalent liquid under pressure being opened by any suitable operation of the hand or otherwise, by means not deemed necessary here to be shown, lubricant or other fluid under pressure passes from the source of supply through the hose 9 by way of the nozzle 10, through the nipple 11, by way of port 14, into the cylinder chamber 18. Here the hydraulic pressure of the incoming lubricant or equivalent fluid acts upon the piston 19 carrying the leather cup 21 held in position by the washer 22. Hydraulic pressure, proportionate to the pressure of the incoming lubricant or equivalent fluid, and proportionate also to the area of the piston 19, will be exerted upon such piston, lubricant or equivalent fluid being discharged from the cylinder space 18 to the port 24 into the smaller or auxiliary cylinder space 25.

The hydraulic pressure, thus exerted upon the main piston 19, will serve to raise the collet 26 upwardly in the casing 12 against the action of the expansion spring 34. This action will be retarded by the flow of lubricant out of the cylinder space 18 through the restricted opening 24 into the auxiliary cylinder space 25.

The lubricant or other hydraulic fluid within the cylinder space 25 will exert the same degree of hydraulic pressure per unit of area as in the cylinder space 18, but the cross-sectional area of the piston 31 being about one-half (½) of the cross-sectional area of the main piston 19, the total hydraulic pressure exerted on it will be only about one-fourth (¼) that of the total pressure exerted on the piston 19. Accordingly, the upward movement of the collet 27 within the casing serves to cause the gripping members 44, 45 and 46 to grip very tightly the outer surface of the nipple 4 with a greater force than will be exerted by the pressure of the auxiliary piston 31 carrying the sealing gasket 37 against the lower end of the nipple 4 whose port 8 is controlled by the check valve 6.

The auxiliary piston 31, carrying the sealing gasket 37, will thus be moved against the lower end of the nipple 4 sufficiently to seal such lower end so that lubricant, passing under pressure through the hose 9 from the nozzle 10 having the nipple 11 through the inlet port 14 into the main cylinder space 18, thence to the port 24 into the auxiliary cylinder space 25, thus through the ports 39', 37' and 35, past the check valve 6 into the space within the nipple 4, will be directed through such course without leaking around the point of junction or meeting of the auxiliary piston 31 and the lower end of the nipple 4.

The cross-sectional area of the auxiliary piston 31 being substantially less than the cross-sectional area of the main piston 19, the hydraulic back pressure caused by the flow of lubricant from the hose 9 into the grease cup, in the manner just described, will not be sufficient to dislodge the adapter 12 from the nipple 4 in view of the much greater pressure exerted by the gripping members 44, 45 and 46 upon the outer surface of the nipple. The joint between the lower end of the nipple 4 and the auxiliary piston 31 carrying the sealing gasket 37, will, however, be sufficient to prevent the leakage and dispersion of lubricant, thus making a sealed union, as long as the lubricant flows from the source of supply under sufficient pressure through the various ports of the device already named. This flow of lubricant, will, under the conditions specified, be sufficient to unseat the ball of the check valve 6 against the action of the expansion spring 5 forming a part of the check valve structure, thus permitting the lubricant to pass into the grease cup 1 to the point where the lubricating action is desired.

When the desired amount of lubricant has been admitted to the grease cup or equivalent device, the source of supply of lubricant is cut off so that no more lubricant will be fed under pressure through the lubricant hose 9 to the other parts of the device. The interruption of the hydraulic pressure caused by the flow of lubricant, will simultaneously release the pressure on the main piston 19 and on the auxiliary piston 31. The release of the pressure on the main piston 19 will cause the spring 34, by its inherent expansive action, to depress the main piston 19, and the collet 26 carried thereby. This action will therefore cause the fingers 44, 45 and 46 to release their gripping action on the outer surface of the nipple 4. It may here be stated that the gripping action of the outwardly tapering fingers 44, 45 and 46 is effected by the form of the frustro-conical opening 17 on the tapering ends of the spring fingers 44, 45 and 46.

At the same time, the pressure on the auxiliary piston 31 having been released, the cylinder 19 and the collet 26 carried thereby, moving downwardly, move with them the auxiliary piston 31 and the sealing gasket 37 carried thereby, so that the sealing action of the sealing gasket 37 against the lower end of the nipple 4 is thus terminated. It may here be stated, that the large lower flange portion 38 at the bottom of the auxiliary piston 31 acts to stop the upward movement of the auxiliary piston 31 carrying the sealing gasket 37 with respect to the collet 26 by means of the stop portion 30 which is provided on the interior surfaces of the collet 26 between the upper portion 28 and the lower portion 29 of the collet.

This completes the description of the mode of operation of the aforesaid illustrative embodiment of the present invention. It will be noted that the device operates automatically both to grip the nipple of the grease cup or equivalent lubricating device and to seal the lower end of the nipple, the application of hydraulic pressure resulting from the flow of lubricant from the source of supply of lubricant under pressure, and the interruption of the flow of lubricant through the device, to terminate the sealing action and to loosen the grip of the adapter or equivalent device on the nipple of the grease cup or equivalent device.

It will be noted that the device is simple in construction, automatic in its operation and does away with the usual mechanical coupling means which act against the hydraulic pressure operating within the device rather than by reason and as a result of such hydraulic pressure. The device, moreover, is simple in construction, eminently satisfactory in operation, economical to manufacture and assemble, and has many other advantages in construction, assembly, mode of operation and use which will readily occur to those skilled in the art to which the present invention relates.

What I claim as my invention is:

1. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, and means associated with said piston and embodying a hollow, substantially cylindrical member mounted on said piston so as to be actuated thereby, said means having a portion extending into said opening for firmly gripping said grease cup or like device under the hydraulic action of lubricant or other fluid impinging upon said piston under pressure, together with means for normally maintaining said first-mentioned means in operative contact with said piston and said first-mentioned means and said piston in positions away from said grease-cup-receiving opening of said casing.

2. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, and means associated with said piston and having a portion extending into said opening for firmly gripping said grease cup or like device under the hydraulic action of lubricant or other fluid impinging upon said piston under pressure, in combination with an auxiliary piston having a diameter relatively smaller than the diameter of said first-mentioned piston and being spaced from said first-mentioned piston for reciprocating within said first-mentioned means, said auxiliary piston having a restricted opening therein for the passage of lubricant or other fluid therethrough, and means associated with said auxiliary piston for connecting said last-mentioned restricted opening in said auxiliary piston with the opening in said grease cup or like device under the hydraulic action of lubricant or other fluid impinging upon said auxiliary piston under pressure.

3. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, and means associated with said piston and embodying a hollow, substantially cylindrical member mounted on said piston so as to be actuated thereby, said means having a portion extending into said opening for firmly gripping said grease cup or like device under the hydraulic action of lubricant or other fluid impinging upon said piston under pressure, together with means for normally maintaining said-mentioned means in operative contact with said piston and first-mentioned means and said piston in positions away from said grease-cup-receiving opening of said casing, in combination with an auxiliary piston having a diameter relatively smaller than the diameter of said first-mentioned piston and being spaced from said first-mentioned piston for reciprocating within said first-mentioned means, said auxiliary piston having a restricted opening therein for the passage of lubricant or other fluid therethrough, and means associated with said auxiliary piston for connecting said last-mentioned restricted opening in said auxiliary piston with the opening in said grease cup or like device under the hydraulic action of lubricant or other fluid impinging upon said auxiliary piston under pressure.

4. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, and means associated with said piston and embodying a hollow, substantially cylindrical member mounted on said piston so as to be actuated thereby, said means having a portion extending into said opening for firmly gripping said grease cup or like device under the hydraulic action of lubricant or other fluid impinging upon said piston under pressure, together with spring means for normally maintaining said mentioned means in operative contact with said piston and first-mentioned means and said piston in positions away from said grease-cup-receiving opening of said casing, in combination with an auxiliary piston having a diameter relatively smaller than the diameter of said first-mentioned piston and being spaced from said first-mentioned piston for reciprocating within said first-mentioned means, said auxiliary piston having a restricted opening therein for the passage of lubricant or other fluid therethrough, and means associated with said auxiliary piston and embodying a hollow, substantially cylindrical body carried by said auxiliary piston and having an opening therethrough communicating with the restricted opening in said auxiliary piston for connecting said last-mentioned restricted opening in said auxiliary piston with the opening in said grease cup or like device under the hydraulic action of lubricant or other fluid impinging upon said auxiliary piston under pressure.

5. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, and means associated with said piston and having a portion extending into said opening for firmly gripping said grease cup or like device under the hydraulic action of lubricant or other fluid impinging upon said piston under pressure, in combination with an auxiliary piston having a diameter relatively smaller than the diameter of said first-mentioned piston and being spaced from said first-mentioned piston for reciprocating within said first-mentioned means, said auxiliary piston having a restricted opening therein for the passage of lubricant or other fluid therethrough, and means associated with said auxiliary piston and embodying a hollow, substantially cylindrical body carried by said auxiliary piston and having an opening therethrough communicating with the restricted opening in said auxiliary piston for connecting said last-mentioned restricted opening in said auxiliary piston with the opening in said grease cup or like device under the hydraulic action of lubricant or other fluid impinging upon said auxiliary piston under pressure.

6. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, said piston being provided with a restricted opening for the passage of lubricant or other fluid therethrough, and means associated with said piston and embodying a hollow, substantially cylindrical member mounted on said piston so as to be actuated thereby, said means having a portion extending into said opening for firmly gripping said grease cup or like device under the hydraulic action of lubricant or other fluid impinging upon said piston under pressure, together with spring means for normally maintaining said first-mentioned means in operative contact with said piston and said first-mentioned means and said piston in positions away from said grease-cup-receiving opening of said casing, in combination with an auxiliary piston having a diameter relatively smaller than the diameter of said mentioned piston and being spaced from said first-mentioned piston for reciprocating within said first-mentioned means, said auxiliary piston having a restricted opening therein for the passage of lubricant or other fluid therethrough, and means associated with said auxiliary piston and embodying a hollow, substantially cylindrical body carried by said auxiliary piston and having an opening therethrough communicating with the restricted opening in said auxiliary piston for connecting said last-mentioned restricted opening in said auxiliary piston with the opening in said grease cup or like device under the hydraulic action of lubricant or other fluid impinging upon said auxiliary piston under pressure.

7. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, a piston within said outer hollow casing adapted for reciprocating movement within said outer hollow casing as a cylinder, said piston being provided with a restricted opening for the passage of lubricant or other fluid therethrough, and means associated with said piston and having a portion extending into said opening for firmly gripping said grease cup or like device under the hydraulic action of lubricant or other fluid impinging upon said piston under pressure, in combination with an auxiliary piston having a diameter relatively smaller than the diameter of said first-mentioned piston and being spaced from said first-mentioned piston for reciprocating within said first-mentioned means, said auxiliary piston having a restricted opening therein for the passage of lubricant or other fluid therethrough, and means associated with said auxiliary piston and embodying a hollow, substantially cylindrical body carried by said auxiliary piston and having an opening therethrough communicating with the restricted opening in said auxiliary piston for connecting said last-mentioned restricted opening in said auxiliary piston with the opening in said grease cup or like device under the hydraulic action of lubricant or other fluid impinging upon said auxiliary piston under pressure.

8. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, piston means within said casing having a portion extending into said grease-cup-receiving opening for firmly gripping said grease cup or like device under the hydraulic action of lubricant or other fluid impinging upon said piston under pressure, said means being provided with a restricted passage therethrough for lubricant or other fluid, in combination with means also provided with a restricted passage therethrough for lubricant or other fluid and embodying an auxiliary piston and a hollow cylindrical body associated therewith and in turn carrying a perforated sealing gasket, for sealing said combined restricted passages for the effective discharge of lubricant or other fluid through said clutch into said grease cup or like device.

9. In a hydraulic clutch for connecting a source of supply of lubricant or other fluid under pressure with a grease cup or like device for receiving such fluid, an outer hollow casing having an opening therein for receiving said grease cup or like device, said outer hollow casing being adapted to serve as a cylinder, means within said casing embodying a main piston and a hollow substantially cylindrical body associated therewith having a portion extending into said grease-cup-receiving opening, and means for firmly gripping said grease cup or like device under the hydraulic action of lubricant or other fluid impinging upon said piston under pressure, said means being provided with a restricted passage therethrough for lubricant or other fluid, in combination with means also provided with a restricted passage therethrough for lubricant or other fluid and embodying an auxiliary piston and a hollow cylindrical body associated therewith and carrying a perforated sealing gasket, for sealing said combined restricted passages for the effective discharge of lubricant or other fluid through said clutch into said grease cup or like device.

ANTHONY BIZZARRI.